United States Patent

[11] 3,616,259

| [72] | Inventor | Ernest Beutler<br>1501 Highland Oaks, Arcadia, Calif. 91006 |
| [21] | Appl. No. | 870,395 |
| [22] | Filed | Oct. 6, 1969 |
| [23] | | Division of Ser. No. 641,733, May 8, 1967 |
| [45] | Patented | Oct. 26, 1971 |

[54] SCREENING PROCEDURE FOR ENZYME DEFICIENCIES
8 Claims, No Drawings

| [52] | U.S. Cl. | 195/103.5 |
| [51] | Int. Cl. | G01n 31/14 |
| [50] | Field of Search | 195/103.5 |

[56] References Cited
OTHER REFERENCES

Sanchez et al., " Biochem. J.," 97:887+ (1965)

Chapman et al., " J. of Clinical Investigation," 41(6):1249+ (1962)

Colowick et al., Methods in Enzymology; I pp. 435– 436; and p. 177 Vol. IV; (1957)

Lowry et al., " J. of Biol. Chem.," 224:1047+ (1957)

Beutler et al., " J. of Clin. Investigation," 43(6):1302 (1964)

*Primary Examiner*—A. Louis Monacell
*Assistant Examiner*—Max D. Hensley
*Attorney*—John Joseph Hall ABSTRACT: This screening method detects enzyme deficiencies in red blood cells by use of a reaction mixture containing a pyridine nucleotide, the reduced form of which fluoresces upon activation by longwave ultraviolet light but not the oxidized form, thereby detecting the presence or absence of enzyme deficiencies.

SCREENING PROCEDURE FOR ENZYME DEFICIENCIES

CROSS-REFERENCE TO RELATED PATENT APPLICATIONS

This application is a division of application Ser. No. 641,733, filed May 8, 1967.

BACKGROUND OF THE INVENTION

This invention relates to a new type of mass screening procedure for the detection of enzyme deficiencies affecting red blood cells, and more particularly concerns the presence or absence of fluorescence in test samples upon being subjected to long range ultraviolet light, depending upon whether reduced or oxidized pyridine nucleotide is present in the test sample.

PRIOR ART

Applicant knows of no prior art making use of fluorescence of a pyridine nucleotide under longwave ultraviolet light to screen for enzyme abnormalities in red blood cells. Generally, various dyes have been used in the past to detect such enzyme deficiencies. Detection of glucose-6-phosphate dehydrogenase deficiency through dye decolorization techniques requires anaerobic conditions, which are difficult to maintain and unsuitable for mass screening. Other tests require fresh blood samples or separation of the blood hemoglobin from the enzyme or special paper.

Where the enzyme deficiency is lack of galactose-1-phosphate uridyl transferase, methylene blue has been used as a receptor dye but requires anaerobic conditions after gassing with carbon monoxide. The reaction is somewhat light sensitive, and it is necessary to use an illuminated water bath for the test.

With respect to screening for glutathione reductase deficiency, applicant knows of no method for screening for this enzyme deficiency in red blood cells.

The procedure described herein is extremely simple, does not require anaerobic conditions, requires only a minute quantity of a blood sample, can be carried out at room temperature or at 37° C., the blood sample need not be freshly obtained, and is very easy to interpret.

SUMMARY OF THE INVENTION

The invention comprises a new type of screening procedure for the detection of various enzymatic deficiencies of red blood cells. The sample to be tested, either of whole blood or of the red cells along, is added to a reaction mixture containing pyridine nucleotide, a buffer, a red cell hemolyzing agent, and an enzyme substrate.

Depending upon the nature of the enzyme deficiency to be detected, the pyridine nucleotide in the reaction mixture is either in reduced or oxidized form.

The spots from the resulting test mixture are made on ordinary filter paper, immediately as a baseline or control spot, and after varying periods of time. The resulting test mixture may be kept at room temperature or incubated at 37° C. After the spots have dried on the filter paper, the spots are subjected to longwave ultraviolet light preferably at a wavelength of from 340 to 370 millimicrons.

Spots containing reduced pyridine nucleotide will persistently fluoresce under longwave ultraviolet light. Such fluorescence remains stable for several days at room temperature.

Where the reaction mixture uses reduced pyridine nucleotide and where the reduced pyridine nucleotide is oxidized in the resulting test mixture, there is loss of fluorescence since oxidized pyridine nucleotide does not fluoresce upon subjection to longwave ultraviolet light.

In particular, my invention will detect deficiencies in red blood cells including glucose-6-phosphate dehydrogenase, hereinafter referred to as G-6A-PD; pyruvate kinase, hereinafter referred to as PK; glutathione reductase, hereinafter referred to as GSSG-R; and galactose-1-phosphate uridyl transferase, hereinafter referred to as transferase.

In general, my invention is readily adaptable to the screening for many other enzymatic abnormalities, such as phosphogluconic dehydrogenase deficiency and triose phosphate isomerase deficiency.

Theoretically, any enzyme deficiency which results either in the reduction of pyridine nucleotide or oxidation of reduced pyridine nucleotide in a test mixture, can be detected by my new procedure.

Precise diagnosis of disorders resulting from such enzyme deficiencies is of great medical value, both from the viewpoint of genetic counseling and also from that of medical therapy. To assay all of these enzymes by known procedures hitherto, is costly, time consuming, and requires expensive and specialized laboratory facilities.

Accordingly, there is a great need for simple and rapid procedures which will differentiate the more common enzyme deficiencies in red blood cells from one another.

It is, therefore, an object of this invention to provide a rapid and relatively simple procedure for the detection of a G-6-PD deficiency in red blood cells.

Another object of this invention is to provide a rapid and relatively simple procedure for the detection of a GSSG-R deficiency in red blood cells.

Still another object of this invention is to provide a rapid and relatively simple procedure for the detection of a PK deficiency in red blood cells.

Yet another object of this invention is to provide a rapid and relatively simple procedure for the detection of transferase deficiency in red blood cells.

A yet further objection of this invention is to provide a rapid and relatively simple procedure for the detection of various enzyme deficiencies in red blood cells.

These and other objects will be more readily understood by reference to the following specification and claims.

DESCRIPTION OF PREFERRED EMBODIMENTS

The same general procedure is used for all screening procedures. In general, one part of whole blood or red cell suspension, usually 0.020 ml. is added to 10 parts of the reaction mixture, usually 0.200 ml. Immediately after this addition, a spot of the resulting test mixture may be made on filter paper, as a control baseline spot. After specified periods of incubation of the test mixture, additional spots from the test mixture are made on the filter paper. After the spots have dried, the filter paper is inspected in a darkened room under a convenient source of longwave ultraviolet light.

The detection of enzyme deficiency is based upon the fact that relatively minute quantities of reduced pyridine nucleotides will fluoresce intensely upon activation by longwave ultraviolet light at a wavelength of from about 340 to about 370 millimicrons.

In the case of the test for G-6-PD deficiency or transferase deficiency, the tests are based upon the reduction of pyridine nucleotide.

In the case of the test for PK deficiency or GSSG-R deficiency, the tests are based upon the oxidation of a reduced pyridine nucleotide.

Although there is some quenching of fluorescence in the presence of hemoglobin in the blood, two factors minimize this quenching. In the first place, the exciting ultraviolet wavelength used in my new procedure is below the maximum absorption band of hemoglobin, which is the Soret region. Further, the emission maximum for my new procedure is located at 465 millimicrons which is near an absorption minimum of hemoglobin.

Secondly, when the resulting test mixture is spotted on ordinary filter paper, there is some chromatographic separation of the blood hemoglobin from the pyridine nucleotides, and consequently, considerable intensification of fluorescence results.

In all of these test procedures, the volume of the blood sample to be tested in relation to the reaction mixture may vary over a range from a minimum of one part of blood sample to 20 parts of reaction mixture, up to a maximum of one part of blood sample to 5 parts of reaction mixture.

Where an incubator is not immediately available, such as in a field screening program, the test reaction may be allowed to proceed at room temperatures.

The following is an example for the detection of G-6-PD deficiency in red blood cells, illustrating the use of my new screening procedure.

EXAMPLE 1

A blood sample suitable for testing may be collected in acid citrate dextrose (ACD), or in heparin, or in disodium ethylenediamine tetra-acetic acid (EDTA) or other suitable blood anticoagulant. The blood sample need not be fresh. Even several week old blood samples stored in acid citrate dextrose at 4° C. are suitable for testing.

A suitable reaction mixture for testing for the presence of G-6-PD comprises a mixture of the following:

| Ingredient in Water Solution | Concentration | Amount in ml. |
| --- | --- | --- |
| Glucose-6-phosphate | 0.01 M | 0.10 |
| Triphosphopyridine nucleotide | 0.0075 M | 0.10 |
| Digitonin, saturated solution |  | 0.20 |
| Potassium phosphate buffer, pH 7.4 | 0.25 M | 0.30 |
| Water |  | 0.30 |
|  | Total | 1.00 ml. |

The basis for the test is that when G-6-PD is present in the blood sample, glucose-6-phosphate is oxidized during the reaction sequence to 6-phosphogluconate, and the triphosphopyridine nucleotide, hereinafter referred to as TPN, is reduced to reduced triphosphopyridine nucleotide, hereinafter referred to as TPNH. Since the blood sample also contains 6-phosphogluconic dehydrogenase, the 6-phosphogluconate formed in the reaction is oxidized by 6-phosphogluconic dehydrogenase, thereby reducing additional TPN to TPNH. When activated by longwave ultraviolet light, the TPNH fluoresces brightly.

In the test procedure, one volume of whole blood, usually 0.02 ml. in amount, is added to 10 volumes of the reaction mixture, usually 0.20 ml., and the resulting test mixture is incubated for 5 to 10 minutes at 37° C.. A spot is made from the resulting test mixture on any suitable filter paper, such as Whatman No. 1. If normal G-6-PD activity is present, the spot on the filter paper will fluoresce brightly under activation by longwave ultraviolet light. Where there is G-6-PD deficient blood, no appreciable fluorescence appears upon subjecting the spot to longwave ultraviolet light of from about 340 to about 370 millimicrons.

Once a test spot has been made on filter paper, and dried, fluorescence is easily detectable for several days thereafter.

The test procedure for the presence of G-6-PD may be varied in many ways without adversely affecting the results.

For example, instead of incubating the resulting test mixture at 37° C., the reaction may be allowed to proceed at room temperatures with equivalent results after a period of 10 to 15 minutes.

Instead of filter paper, any suitable absorbent material may be used to make spots from the test mixture, so long as the material permits substantial drying of the spots to halt the test reaction.

Instead of disodium ethylene diamine tetra-acetic acid, the free acid as well as other alkali salts of this acid may be used as an anticoagulant.

Since the reaction proceeds rapidly even at 0° C., the reaction time allotted before the commencement of spot testing may vary from a minimum of 2 minutes to a maximum of 10 to 15 minutes at 37° C. These reaction times should be increased by a factor of about 1.5 where the reaction takes place at room temperatures.

For example, instead of the 0.20 ml. of a saturate solution of digitonin, 0.20 ml. of a 1 percent solution of saponin may be substituted as an alternative ingredient in the reaction mixture. When this substitution is made, the resulting test mixture need be incubated only about 5 minutes at 37° C.

The concentrations of TPN and glucose-6-phosphate may be varied without substantially altering the results of this test procedure. For example, the concentration of glucose-6-phosphate in the reaction mixture may be varied over a range beginning with a low of 1/5 to a high of 30 times the concentration given in example 1, with a corresponding range of TPN concentration varying over a low of one-fourth to a high of 10 times the concentration given in example 1.

The potassium phosphate buffer may vary in pH from a low of 6.5 to a high of 8 and in a concentration range from a low of one-tenth to a high of 5 times the concentration given in example 1. Suitable phosphate buffers other than potassium may be used.

The digitonin solution need not be saturated so long as there is sufficient digitonin present in the reaction mixture to effectively lyse the red blood cells. The concentration of digitonin may vary from a one-tenth saturated solution to a fully saturated solution. Where saponin is used, the concentration may range from a one-tenth percent solution to a 20 percent solution. Other suitable lysing agents may be used so long as no interference occurs with the test reaction.

The following is an example for the detection of the absence of the enzyme, galactose-1-phosphate uridyl transferase. The lack of this enzyme in the blood causes galactosemia, which if untreated, results in cirrhosis of the liver, blindness, and mental retardation. If this enzyme deficiency is detected early, a galactose-free diet will prevent these abnormalities.

EXAMPLE 2

A blood sample for testing is collected in heparin. The reaction mixture for this test comprises the following:

| Ingredient in water solution | Concentration | Amount in ml. |
| --- | --- | --- |
| Uridine diphosphoglucose | $9.5 \times 10^{13}$ M | 0.2 |
| Alpha galactose-1-phosphate | $2.7 \times 10^{11}$ M | 0.4 |
| TPN | $6.6 \times 10^{13}$ M | 0.6 |
| Tris-acetate buffer, pH 8.0 | 0.75 M | 2.0 |
| Digitonin, saturated solution |  | 0.8 |
| EDTA | $2.7 \times 10^{12}$ M | 0.03 |
| Water |  | 1.97 |
|  | Total | 6.00 |

The basis for detection is that when whole blood is added to the above reaction mixture, uridine diphosphoglucose (UDPG) and alpha galactose-1-phosphate (Gal-1-P) react to form alpha-glucose-1-phosphate in the presence of transferase. The alpha-glucose-1-phosphate is transformed by phosphoglucomutase, which is present in the hemolysate, to alpha-glucose-6-phosphate, which in turn mutarotates spontaneously and with the help of phosphohexose insomerase to beta-glucose-6-phosphate. Glucose-6-phosphate phosphate dehydrogenase, present in the hemolysate, oxidizes beta-glucose-6-phosphate to 6-phosphogluconate which in turn is oxidized to ribulose-5-phosphate. Both of these steps result in the reduction of TPN to TPNH, which fluoresces under longwave ultraviolet light. Substantially no fluorescence occurs in tests derived from transferase deficient blood samples.

In the test procedure, one volume of heparinized whole blood, usually 0.02 ml., is added to 10 volumes, usually 0.2 ml. of reaction mixture. The pipette used to add the blood to the reaction mixture is left in the tube, and the resulting test mixture is incubated aerobically at 37° C. At the end of two hours, a spot, a few microliters of test solution, is made on Whatman No. 1 filter paper and is allowed to dry at room temperature. Such drying usually takes about 5 minutes. The spot is examined within 24 hours after drying under longwave ultraviolet light of from about 340 to about 370 millimicrons.

Under such longwave ultraviolet light, spots resulting from normal blood fluoresce brightly, while spots from blood deficient in transferase have no appreciable fluorescence. After drying, the spots are relatively stable up to one week at room temperatures.

The test procedure may be varied in several ways without adversely affecting the results.

Streaks of capillary blood may be dried on filter paper or other suitable absorbent material and placed into a suitable container holding an appropriate volume, (about 10 times the blood volume) of the reaction mixture. While the filter paper is immersed in the reaction mixture, the reaction mixture is incubated for 2 to 3 hours at 37° C. After incubation, a spot is made from the resulting test mixture on filter paper or other suitable absorbent material that permits drying of spots. The spot so made is allowed to dry at room temperature, which usually takes about 5 minutes. Thereafter, the resulting spot is examined under longwave ultraviolet light for fluorescence in the same manner as before.

So long as it has not coagulated, fresh whole blood may be used instead of heparinized blood for the test.

The test may be carried out at room temperatures, with a corresponding decrease in reaction rate of from one-half to one-third the rate at 37° C.

Any suitable absorbent material may be used instead of filter paper so long as it permits drying of the spot made on it.

The time of incubation at 37° C. may vary from 1 to 3 hours without adversely affecting the results.

Instead of whole blood, a 50 percent suspension of red cells in 0.9 percent NaCl solution may be used with results similar to that using whole blood.

EDTA may be omitted as an ingredient in the reaction mixture since it only helps enhance the development of fluorescence in the test mixture. Where blood for testing has been collected in EDTA to prevent coagulation, the reaction mixture must omit EDTA.

Blood samples collected in heparin may be stored as long as one week at room temperature and may still be used in this test procedure with results equivalent to fresh blood samples.

The digitonin solution concentration may be varied from a low of one-tenth saturation up to saturation, so long as there is sufficient digitonin to effectively lyse the red blood cells. Instead of digitonin, a 1 percent solution of saponin may be used with equivalent results. The concentration of saponin may vary from one-tenth to 20 percent without adverse effect on the test procedure. Other suitable red blood cell lysing agents may also be used, so long as no interference occurs with the test reaction.

The concentration of UDPG, Gal-1-P, and TPN in the reaction mixture may be varied without substantially altering the results of the test procedure. Thus, each of the corresponding concentrations of UDPG, Gal-1-P, and TPN, may be varied over a range from a low of one-fourth to a high of 10 times the concentrations given in example 2.

The tris-acetate buffer may vary over a pH range of 6.2 to 9.2, and a concentration range from a low of one-tenth to a high of 3 times the concentration given in example 2.

The following is an example for the detection of a pyruvate kinase deficiency in red blood cells.

EXAMPLE 3

Anticoagulants such as heparin, ACD, or EDTA, or other suitable anticoagulants, may by used in the preparation of the blood sample to be tested. The anticoagulated blood sample is then centrifuged and the plasma and buffy coat are removed with careful aspiration or other suitable means. The white blood cells are removed since white cell pyruvate kinase activity may be normal even though the red blood cells are deficient in pyruvate kinase.

Four volumes of physiologic saline solution are added to the red blood cells to produce a 20 percent suspension of red blood cells. The resulting suspension of red blood cells is now ready for testing.

The following is a suitable reaction mixture for the test procedure:

| Ingredient in water solution | Concentration | Amount in ml. |
| --- | --- | --- |
| Phospho (enol) pyruvate (tricyclohexylammonium salt) | 0.15 M (neutralized) | 0.03 |
| Adenosine diphosphate (ADP) | 0.03 M (neutralized) | 0.10 |
| DPNH | 0.015 M (neutralized) | 0.10 |
| Magnesium sulfate | 0.08 M | 0.10 |
| Potassium phosphate buffer pH 7.4 | 0.25 M | 0.05 |
| Water | | 0.62 |
| Total | | 1.00 |

The basis of this test procedure is that where pyruvate kinase is present in the blood sample, a phosphate group from phospho (enol) pyruvate is transferred to adenosine diphosphate (ADP), forming pyruvate and adenosine triphosphate (ATP). Lactate dehydrogenase in the hemolysate catalyzes the reduction of pyruvate to lactate with the oxidation of the reduced diphosphopyridine nucleotide (DPNH) in the reaction mixture to diphosphopyridine nucleotide (DPN). Since DPNH fluoresces under longwave ultraviolet light and DPN does not, there is a gradual loss of the fluorescence in a test sample derived from normal blood.

In the test procedure, one volume of the red blood cell suspension, usually 0.02 ml., is added to 10 volumes of the reaction mixture, usually 0.20 ml., and the resulting test mixture is incubated at 37° C. for 30 minutes, after which spots from the test mixture are made on filter paper as previously described in preceding examples, dried, and examined under longwave ultraviolet light. Where the original blood sample contained red blood cells deficient in pyruvate kinase, bright fluorescence of spots derived from such a blood sample will persist, while spots derived from normal blood samples will have no appreciable fluorescence, after incubation.

The neutralized ingredients of the reaction mixture of example 3 may be neutralized to a pH of 7–8 with pH paper using approximately 0.2 N NaOH.

Hypotonic lysis is used to release enzyme from the red blood cells rather than digitonin or saponin to prevent any substantial release of enzyme from white cells which may remain in the treated blood sample. Any suitable lysing agent may be used so long as it causes no interference with the test reaction.

The concentration of the ingredients of the reaction mixture of example 3 may be varied without adverse effect on the screening procedure. The concentration of phospho (enol) pyruvate (tricyclohexylammonium salt) may range from a low of one-fourth to a high of 3 times the concentration given in example 3, with a corresponding range in concentration of ADP from one-third to 10 times, and with a corresponding range of DPNH from one-fourth to 2 times, the concentrations given in example 3.

The concentration of magnesium sulfate may range from a low of one-fourth to a high of 5 times the concentration given in example 3, along with the corresponding ranges for the other ingredients in the reaction mixture.

The potassium phosphate buffer may range from a pH of 6.5 to 7.5 and from a low of one-tenth to a high of 5 times the concentration given in example 3.

The physiologic saline solution for the suspension of the red blood cells may vary over a range of about one-fourth less to about one-fourth more than isotonic strength, so long as lysing of the red blood cells occurs in the resulting test mixture.

Instead of incubation of the test mixture at 37° C. the reaction may be allowed to proceed at room temperatures, with a corresponding increase in reaction time of from 1½ to 2 times.

The reaction time alloted before commencement of spot testing may vary from a minimum of about 10 minutes to a maximum of about 30 minutes at 37° C.

Other water soluble magnesium salts may be used instead of magnesium sulfate so long as no interference occurs with the reaction.

Various water soluble potassium phosphate salts may be used as a buffer.

Fresh blood may be used so long as it has not coagulated.

Instead of disodium ethylene diamine tetra-acetic acid, the free acid as well as other alkali salts of ethylene diamine tetra-acetic acid may be used as an anticoagulant.

The following is an example for the detection of a GSSG-R deficiency in red blood cells.

EXAMPLE 4

A blood sample suitable for testing may be collected in ACD, EDTA, or heparin. Such samples may be stored for at least 3 weeks without adverse effects on the test procedure.

A suitable reaction mixture for the detection of GSSG-R deficiency is the following:

| Ingredient in water solution | Concentration | Amount in ml. |
| --- | --- | --- |
| Glutathione (oxidized) | 0.033 M | 0.1 |
| TPNH | 0.015 | 0.1 |
| Potassium phosphate buffer pH 7.4 | 0.25 M | 0.6 |
| Digitonin, saturated solution | | 0.2 |
| | Total | 1 ml. |

The basis for this test procedure is that where glutathione reductase is present in the blood hemolysate, oxidized glutathione (GSSG) is reduced to glutathione (GSH) and TPNH is oxidized to TPN. Since TPNH fluoresces when activated with longwave ultraviolet light and TPN does not so fluoresce, a gradual loss of fluorescence takes place as the reaction proceeds, where the blood sample is normal.

In the test procedure, one volume of blood, usually 0.02 ml., is added to 10 parts of reaction mixture, usually 0.20 ml. Spots from the resulting test mixture are made on suitable filter paper every 15 minutes and the disappearance of fluorescence is compared with a control sample over a suitable period of time up to 90 minutes, under longwave ultraviolet light of from about 340 to about 370 millimicrons. A GSSG-R deficiency is detected by the persistence of fluorescence in a spot.

The reaction may be carried out at 37° C. or at room temperatures. Where room temperatures are used, the reaction time may be from 1½ to 2 times the reaction time at 37° C.

The concentrations of the ingredients of the reaction mixture of example 4 may be varied without adversely affecting the test results. The concentration of GSSG may range from a low of one-fourth to a high of 20 times the concentration given in example 4, while the concentration of TPNH may vary over a corresponding range of a low of one-half to a high of 2 times the concentration given in example 4.

As in examples 1 and 2, saponin may be substituted for digitonin, and the same ranges of concentrations may be used in example 4 as indicated for digitonin and saponin in examples 1 and 2. The concentration of phosphate buffer may vary from a low of one-tenth to a high of 10 times the concentration given in example 4, and from a pH of 6.5 to a pH of 9.5 corresponding to the concentration.

Other suitable lysing agents may be used instead of digitonin and saponin provided that no interference results with the test procedure.

Fresh blood may be used so long as it is not coagulated.

Various water soluble potassium phosphate salts may be used as a buffer.

Instead of disodium ethylene diamine tetra-acetic acid, the free acid as well as other alkali salts of ethylene diamine tetra-acetic acid may be sued as an anticoagulant.

Instead of filter paper, any suitable absorbent material may be used to make spots from the test mixture, so long as the material permits substantial drying of the spots to halt the test reaction.

Although I have described preferred embodiments of my invention, it is understood that the scope of the invention is not limited thereby, but numerous variations in reagents and procedures are possible without departing from the spirit and scope of the invention as claimed hereinafter.

For example, any water soluble salt may be used as a buffer provided that no interference occurs with the test reaction.

Fresh, uncoagulated blood, may be used in each of the test procedures.

The screening procedures disclosed herein are applicable to screening for the presence or absence of various other enzymes associated with red blood cells by the use of the proper substrates for the particular enzymes sought, along with any required cofactors or coenzymes, where the presence or absence of any such enzyme results in the oxidation or reduction of a pyridine nucleotide, directly or indirectly.

I claim:

1. A method for the detection of pyruvate kinase deficiency in red blood cells of a blood sample, comprising:
    removing the red blood cells from the blood sample;
    adding 4 volumes of physiologic saline solution to the red blood cells to produce a 20 percent suspension of red blood cells;
    adding one part of the resulting red blood cell suspension to 10 parts of an aqueous solution made up of 3 parts of an aqueous solution of neutralized phospho (enol) pyruvate (tricyclohexylammonium salt) having a molarity of 0.15, 10 parts of an aqueous solution of neutralized adenosine diphosphate having a molarity of 0.03, 10 parts of an aqueous solution of neutralized reduced diphosphopyridine nucleotide having a molarity of 0.015, 10 parts of an aqueous solution of magnesium sulfate having a molarity of 0.08, 5 parts of an aqueous solution of potassium phosphate buffer having a pH of 7.4 and a molarity of 0.25, and 62 parts of water;
    allowing the resulting test mixture to react;
    making a spot from the resulting test mixture on filter paper;
    subjecting said spot after drying to longwave ultraviolet light at a wavelength of from about 340 to about 370 millimicrons whereby no fluorescence of said spot occurs under said ultraviolet light when said spot originates from a blood sample having red blood cells containing pyruvate kinase and persistent fluorescence visible to a peronson's eye of said spot is produced by said ultraviolet light when said spot originates from a blood sample having red blood cells deficient in pyruvate kinase.

2. A method for the detection of pyruvate kinase deficiency in red blood cells of a blood sample, comprising:
    adding an anticoagulant to the blood sample;
    centrifuging the anticoagulated blood sample;
    removing the plasma and resulting buffy coat from the blood sample;
    adding from 3 to 5 volumes of physiologic saline solution to the remaining red blood cells to produce a red blood cell suspension;
    adding one part of the resulting red blood cell suspension to from 5 to 20 parts of an aqueous solution made up of 3 parts of an aqueous solution of neutralized phospho (enol) pyruvate (tricyclohexylammonium salt) having a molarity of from 0.04 to 0.45, 10 parts of an aqueous solution of neutralized adenosine diphosphate having a molarity of from 0.01 to 0.3, 10 parts of an aqueous solution of neutralized reduced diphosphopyridine nucleotide having a molarity of from 0.004 to 0.03, 10 parts of an aqueous solution of magnesium sulfate having a molarity of from 0.02 to 0.4, 5 parts of an aqueous solution of potassium phosphate buffer having a pH of from 6.5 to 7.5 and a molarity of from 0.25 to 1.25, and 62 parts of water;

allowing the resulting test mixture to react;

making a spot from the resulting test mixture on filter paper;

subjecting said spot after drying to longwave ultraviolet light at a wavelength of from about 340 to about 370 millimicrons whereby no fluorescence of said spot occurs under said ultraviolet light when said spot originates from a blood sample having red blood cells containing pyruvate kinase and persistent fluorescence visible to a person's eye of said spot is produced by said ultraviolet light when said spot originates from a blood sample having red blood cells deficient in pyruvate kinase.

3. A method for the detection of glutathione reductase deficiency in red blood cells of a blood sample, comprising:

adding one part of the blood sample to 10 parts of an aqueous solution made up of 1 part of an aqueous solution of oxidized glutathione having a molarity of 0.33, 1 part of an aqueous solution of reduced triphosphopyridine nucleotide having a molarity of 0.015, 6 parts of an aqueous solution of potassium phosphate buffer at a pH of 7.4 and having a molarity of 0.25, and 2 parts of an aqueous solution of a red blood cell lysing agent;

allowing the resulting test mixture to react;

making a spot from the resulting test mixture on filter paper;

subjecting said spot after drying to ultraviolet light at a wavelength of from about 340 to about 370 millimicrons whereby no fluorescence of said spot occurs under said ultraviolet light when said spot originates from a blood sample having red blood cells containing glutathione reductase and persistent fluorescence visible to a person's eye of said spot is produced by said ultraviolet light when said spot originates from a blood sample having red blood cells deficient in glutathione reductase.

4. A method according to claim 3 in which the aqueous solution of a red blood cell lysing agent is a saturated solution of digitonin.

5. A method according to claim 3 in which the aqueous solution of a red blood cell lysing agent is a 1 percent solution of saponin.

6. A method for the detection of glutathione reductase deficiency in red blood cells of a blood sample, comprising:

adding one part of the blood sample to from 5 to 20 parts of an aqueous solution made up of 1 part of an aqueous solution of oxidized glutathione having a molarity of from 0.008 to 0.66, 1 part of an aqueous solution of reduced triphosphopyridine nucleotide having a molarity of from 0.004 to 0.03, 6 parts of an aqueous solution of potassium phosphate buffer at a pH of from 6.5 to 9.5 and having a molarity of from 0.025 to 2.5, and 2 parts of an aqueous solution of a red blood cell lysing agent;

allowing the resulting test mixture to react;

making a spot from the resulting test mixture on suitable absorbent material;

subjecting said spot after drying to longwave ultraviolet light at a wavelength of from 340 to about 370 millimicrons whereby no fluorescence of said spot occurs under said ultraviolet light when said spot originates from a blood sample having red blood cells containing glutathione reductase and persistent fluorescence visible to a person's eye of said spot is produced by said ultraviolet light when said spot originates from a blood sample having red blood cells deficient in glutathione reductase.

7. A method according to claim 6 in which the aqueous solution of a red blood cell lysing agent is an aqueous solution of digitonin ranging from a one-tenth saturated to a saturated solution.

8. A method according to claim 6 in which the aqueous solution of a red blood cell lysing agent is an aqueous solution of saponin having a concentration ranging from a one-tenth percent to a 20 percent solution.

* * * * *